United States Patent [19]

Mishina et al.

[11] Patent Number: 5,010,483

[45] Date of Patent: Apr. 23, 1991

[54] VECTOR PROCESSOR CAPABLE OF INDIRECT ADDRESSING

[75] Inventors: Yusuke Mishina, Kunitachi; Keiji Kojima, Kodaira, both of Japan

[73] Assignee: Hitachi, Ltd., Tokyo, Japan

[21] Appl. No.: 178,913

[22] Filed: Apr. 7, 1988

[30] Foreign Application Priority Data

Apr. 8, 1987 [JP] Japan ................. 62-84735

[51] Int. Cl.⁵ ........................................ G06F 15/347
[52] U.S. Cl. .................... 364/200; 364/232.21; 364/255.2; 364/255.1; 364/231.8
[58] Field of Search ... 364/200 MS File, 900 MS File

[56] References Cited

U.S. PATENT DOCUMENTS

| | | | |
|---|---|---|---|
| 4,651,274 | 3/1987 | Omoda et al. | 364/200 |
| 4,665,479 | 5/1987 | Oinoga | 364/200 |
| 4,745,547 | 5/1988 | Buchholz et al. | 364/200 |
| 4,779,192 | 10/1988 | Torii et al. | 364/200 |
| 4,780,810 | 10/1988 | Torii et al. | 364/200 |
| 4,823,258 | 4/1989 | Yashazaki | 364/200 |
| 4,870,569 | 9/1989 | Nakatoni et al. | 364/200 |

Primary Examiner—Gareth D. Shaw
Assistant Examiner—Kevin A. Kriess
Attorney, Agent, or Firm—Antonelli, Terry, Stout & Kraus

[57] ABSTRACT

A vector processor includes a first read circuit for reading a first vector including a plurality of vectors such as a vector having elements denoting a compare key as a search request and a vector having elements designating a search range associated with each compare key, a second read circuit for generating, from a portion of the elements of the first vector read by the first read circuit and designated by the search range, information specifying elements of a second vector to be referenced so as to read the vector elements to be referenced in accordance with the generated information, and an arithmetic or logic circuit for effecting an arithmetic or logic operation on the elements of the second vector and the elements of the first vector thus read out, respectively.

22 Claims, 8 Drawing Sheets

VECTOR PROCESSOR CAPABLE OF INDIRECT ADDRESSING

BACKGROUND OF THE INVENTION

The present invention relates to a vector processor, and in particular, to a vector processor suitable for effecting a vector processing of a binary search necessary in a data base processing.

Conventionally, an application example of a search operation in a data base processing has been described in the U.S. Pat. No. 4,644,471. Furthermore, a vectorization of a binary search operation as a representative algorithm of a search operation heretofore has also been implemented by use of a complex combination of vector instructions as described in the U.S. Patent mentioned above.

Referring now to the flowchart of FIG. 9, description will be given of a processing procedure of a vector-type binary search.

First, meanings of the variables used in the flowchart of FIG. 9 will be described.

$N_1$ stands for a length of a vector $D_1$ including a compare key which is a search request, whereas $N_2$ is a length of a vector $D_2$ which is an object of the search and is beforehand sorted. According to the function of the binary search operation, for each element $D_1(j)$ ($j=0, 1, ..., N_1-1$) of the vector $D_1$, if there exists, in the vector $D_2$, $D_2(k)$ whose value is identical to the value of $D_1(j)$, a result of k is returned for each $D_1(j)$. A vector L indicates the lower limit of the search range, a vector U indicates the upper limit thereof, a vector CI designates the center of the search range, and a vector CV(j) denotes a value of each vector element at the center of the search range represented by CI(j) in the search range indicated by $D_2$. M stands for a bit series having a length of $N_1$ for storing a compare result. (M is referred to as a mask herebelow.) The result of the binary search k is stored in an area for the vector U.

According to the function of the vector-type binary search program of FIG. 9, for a vector $D_1(j)$ ($j=0, ..., N_1-1$), if there exists, in the sorted vector $D_2$, $D_2(k)$ whose value is equal to that of $D_1(j)$, a result of k is returned to U(j). However, if there exist a plurality of elements of $D_2$ which have the value identical to that of $D_1(j)$, namely, if $D_2(k_0), ..., D_2(k_{l-1})$ are respectively identical to $D_1(j)$, $min(k_0, ..., k_{l-1})$ is returned to U(j).

Referring to the flowchart of FIG. 9, description will be given of a procedure of the vector-type binary search.

A counter i of the execution count is reset (step 901) and the vectors L and U are initialized to set the values of the lower and upper limits of the search range (step 902). In the first search (i=0), the search range entirely includes $D_2$; consequently, the respective elements of the lower-limit vector L are 0 and those of U are $N_2-1$. Steps 901 and 902 are effected by use of vector instructions which assign a scalar value to the respective elements of the vector.

The counter i is then compared with $\log N_2$ (step 903). If the counter i is equal to or greater than $\log N_2$, the processing is terminated; otherwise, steps 904 to 907 are sequentially executed and then the counter is incremented by one (step 908); thereafter, control returns to the step 903. That is, the steps 904 to 907 are executed $\log N_2$ times.

In the step 904, a computation of the center position of the search range is achieved for each element (the compare key) of $D_1$. This step is effected by use of vector instructions which divide by two a result attained by adding the lower-limit vector L and the upper-limit vector U for each element and store the result in the center position vector CI corresponding to the respective elements. Next, each element $D_2(CI(j))$ of $D_2$ located at the center of the search range thus computed in the step 904 is stored in the center value vector CV(j). This step is effected by instruction moving vectors. Thereafter, $D_1(j)$ ($j=0, ..., N_1-1$) is compared with CV(j) ($j=0, ..., N_1-1$) for the respective corresponding elements. If $D_1(j)$, namely, the compare key is smaller, the j-th bit of a mask M is set to 0; otherwise, the j-th bit thereof is set to 1 (step 906). When the j-th bit of the mask M is 0, namely, the value to be compared CV(j) (=$D_2(CI(j))$) is less than the compare key $D_1(j)$, the value of CI(j) is stored as a new search lower-limit value L(j) associated with each compare key. When the j-th bit of the mask M, namely, the value of CV(j) is equal to or greater than the compare key $D_2(j)$, the value of CI(j) is stored as the search upper limit U(j) corresponding to $D_2(j)$ (step 907). The steps 906 and 907 are both accomplished by use of vector instructions.

Since the vector $D_2$ has been sorted in the ascending order, the search range stored in the vectors U and L associated with the respective compare keys is reduced to half the original value as a result of the step 907. Consequently, when the steps 904 to 907 are repeatedly executed $\log N_2$ times, a search for the elements of $D_2$ equal to the compare key can be completed. In the step 906, if the value of the element of $D_2$ at the center of the search range is identical to the key value, the center position is set to the upper limit of the search range corresponding to the key value for the next search in the step 907; consequently, even if there exist a plurality of elements of $D_2$ which are equal to the key value $D_1(j)$, the position of the element thereof appearing first in $D_2$ is attained as the upper-limit vector U(j).

According to the prior art technology described above, the vector including compare keys for the search request in the binary search operation and two vectors of the upper and lower limits representing the search range corresponding to the respective compare keys are separated from each other so as to accomplish the processing separatedly on the respective vectors, which leads to problems that the processing time is increased and that a work area is required. Next, these problems will be described with reference to the flowchart of the binary search operation.

According to the flowchart of FIG. 9, the binary search operation is effected by use of six kinds of vector instructions. Namely, the step 904 requires an add instruction to attain a sum of the vectors U and L and a shift instruction to divide the result by two. The step 905 includes a move instruction to load the center value vector CV with a value of the center position of the search range obtained through the step 904. The step 906 uses a compare instruction to generate a mask vector so as to rewrite the upper-limit vector and the lower-limit vector. Step 907 requires move instructions to rewrite the upper-limit vector U and the lower-limit vector L, respectively. Incidentally, the vectors (the vector $D_1$ including a compare key as a search request, the upper-limit vector U, the lower-limit vector L, the sorted vector $D_2$ as an object of the search, the mask vector M, the center position vector CI, and the center value vector CV) as operation objects of the vector instructions above are stored in the main storage. Conventionally, in a vector processor (for example, type M680H Integrated Array Processor of the Hitachi Ltd.) processing data in the main storage, only read means associated with two channels and write means associated with a channel can be simultaneously used for the main storage. In contrast thereto, each of the vector instructions effecting the binary search operation above requires means to read one or two input vectors and to write an output vector; consequently, it is impossible to increase the processing speed by initiating in a parallel fashion the seven vector instructions effecting the binary search processing so as to execute the vector instructions in an overlapped manner, namely, the steps 904 to 907 of FIG. 9 must be sequentially effected.

In addition, since the binary search operation includes a plurality of vector instructions, the center position vector CI, the center value vector CV, and the mask vector M are required as work areas for the processing, thus leading to the problems associated with the processing time and the necessary areas.

SUMMARY OF THE INVENTION

It is therefore an object of the present invention to provide a vector processor having read means for two channels and write means for a channel, which is suitable for executing high-speed operations such as a binary search operation with respect to three objective vectors such as a vector comprising a compare key as a search request, a vector denoting a search range corresponding to each search request, and a vector comprising values of a search object indirectly specified by the search range.

The above object can be achieved by a vector processor according to the present invention which comprises first read means for reading as a first collective vector a plurality of vectors such as a vector constituted by elements each indicating a compare key as a search request and a vector constituted by elements each indicating a search range associated with each said compare key, a second read means for generating, from a portion of the elements of said first vector read by said first read means and designated by the search range, information specifying elements of a second vector to be referenced to read said vector elements to be referenced in accordance with the generated information, and arithmetic or logic operation means for effecting an arithmetic or logic operation on the elements of the second vector and the elements of the first vector thus read out, respectively.

As shown in FIG. 8, in the binary search operation of the present invention, a pipeline operation is performed on two vectors X and Y so as to produce a vector Z. Each element of the input vector X includes a four-byte tag part, a four-byte compare key part denoting the search request, and four-byte index parts respectively designating the upper-limit and lower-limit values of the search range. Each element of the vector Y including the search object is constituted by a four-byte key.

As can be seen from FIG. 8, for each search element of the vector X, the upper limit and the lower limit of the search range are initialized so as to include all elements of the vector Y.

The binary search operation is conducted as follows. First, the element $X_i$ of the vector X is fetched by use of the first read means. Of the element $X_i$, the upper-limit and lower-limit values of the index parts denoting the search range are inputted to the position information generate means to generate position information so as to reference the second vector. As a result, the position (to be referred to as the center position j herebelow) of the vector element located at the center of the search range of the vector Y is attained and is then transmitted to the second read means, which then reads the value (to be referred to as the center value $Y_j$ herebelow) of the vector element located at the center of the search range of the vector Y and compares the value with the compare key part of the requested element $X_i$. As a result of the comparison, if the compare key part of $X_i$ is smaller than $Y_j$, there is outputted an element $Z_i$ of the vector Z including the center value j as the new lower-limit value and the tag value, compare key part, and upper-limit value identical to those of $X_i$. If the compare key part of $X_i$ is equal to or greater than $Y_j$, there is outputted an element $Z_i$ of the vector Z including the center value j as the new upper-limit value and the tag value, compare key part, and upper-limit value identical to those of $X_i$.

When this instruction is executed once, the search range associated with each element of the vector X is reduced to half the original value; consequently, when the instruction is executed log (number of elements of vector Y) times, the value of the upper-limit index can be set to the position of the element of the vector Y, the position identical to the compare key part of each element $X_i$ of the vector X.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
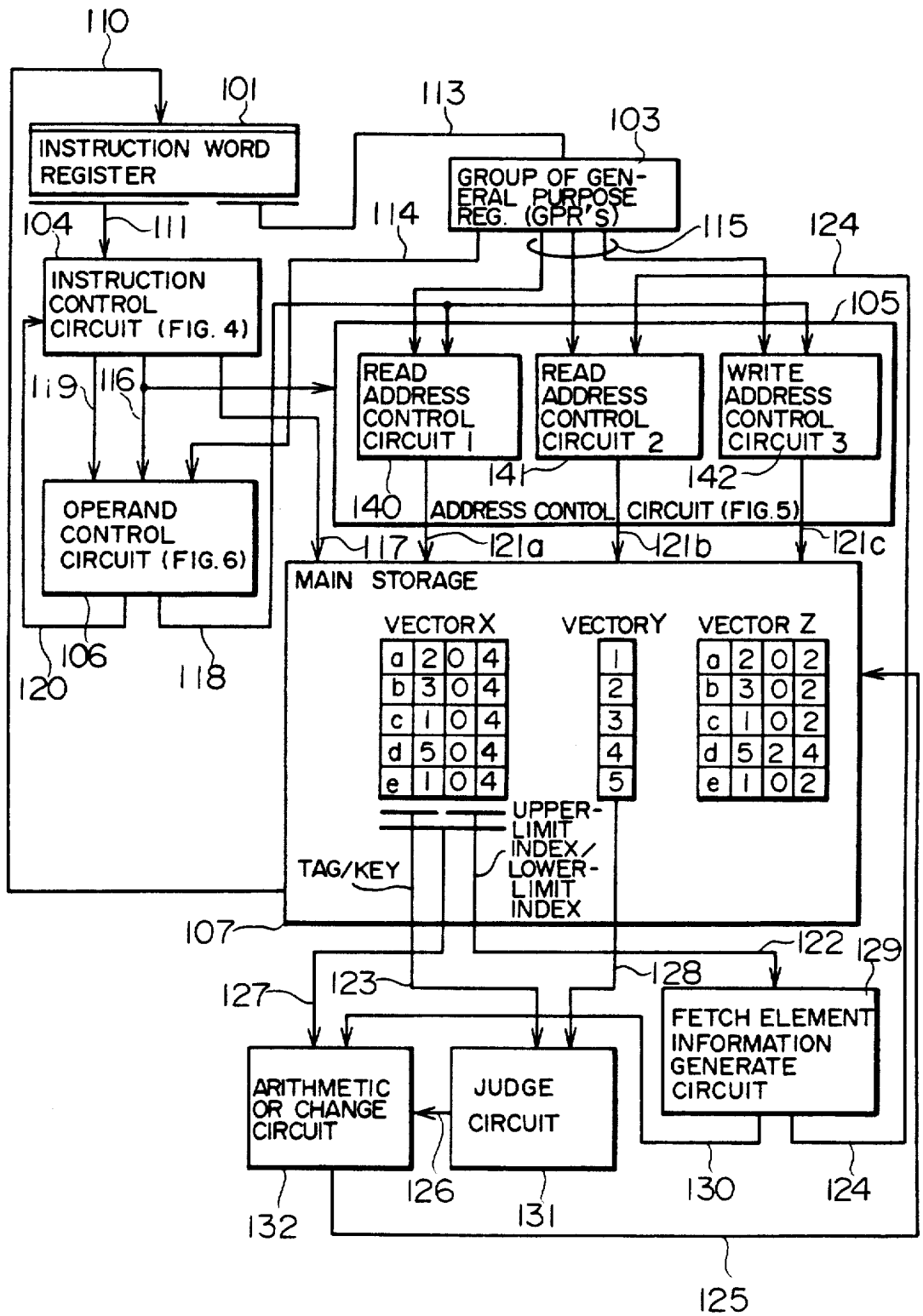
FIG. 1 is a schematic diagram showing the overall configuration of a vector processor as an embodiment according to the present invention.

Referring now to the drawings, description will be given of an embodiment according to the present invention.

In the configuration of FIG. 1, when a vector instruction provided by the present invention to request a binary search operation is read from a main storage 107 via a data path 110 into an instruction register 101. Upon receiving the instruction via a data path 111, an instruction control circuit 104 then generates various control signals necessary for the execution of the instruction. In concurrence with the operation above, from a plurality of general registers specified by the instruction and hence selected from a group of general purpose registers (GPR) 103, the pertinent control signals are fed to and are set to an operand control circuit 106 and an address control circuit 105 via data paths 114 and 115.

After the signals are completely set thereto, the instruction control circuit 104 sends an operand fetch request via a control signal line 117 to the main storage 107 each time a clock signal is received.

The operand control circuit 106 includes a counter for the vector X comprising a search request. The value of the counter is transmitted via a data path 118 to the address control circuit 105. Upon receiving the fetch request via the control signal line 117, the main storage 107 reads an element X(i) of the vector X by use of a fetch address received via a data path 121a from a read address control circuit 1, 140 in the address control circuit 105. The vector element X(i) comprises a tag which is not directly used as an object of the operation, a compare key denoting a search request, and a pair of upper-limit and lower-limit values of a search range in the vector Y corresponding to each compare key. Of the vector element X(i) thus read out, partial area specify information indicating a search range in the vector Y is sent via a data path 122 to a circuit 129 for generating information about a fetch element position in a partial area. The position information generate circuit 129 constitutes a vector read circuit together with a read address control circuit 2, 141. The position information generate circuit 129 divides by two the sum of the counter value for the upper-limit element in the search range of the vector Y and the counter value of the lower-limit element thereof based on the received partial area specify information so as to attain a counter value j (to be referred to as a center element counter value herebelow) of a vector element located at the center of the search range; thereafter, the value of j is sent via a data path 130 to a partial area specify information arithmetic or change circuit 132 and is further transmitted via a data path 124 to the address control circuit 105. The read address control circuit 2, 141 in the address control circuit 105 generates from the center element counter value j thus received an address of a vector element at the center of the search area in the vector Y as the object of the search and transmits the address via a data path 121b to the main storage 107. The main storage 107 reads an element Y(j) of the vector Y based on the fetch request sent from the instruction control circuit 104 via the data path 117 and an operand address sent from the address control circuit 105 via the data path 121b and then sends the element Y(j) via a data path 128 to the partial area specify information change judge circuit 131. The change judge circuit 131 functions as an arithmetic unit of the present invention together with a partial area specify information arithmetic or change circuit 132, which will be described later in this specification. The change judge circuit 131 compares the compare key value of the element X(i) of the vector X received via the data path 123 with the element Y(j) of the vector Y received via the data path 128 and sends the compare result via a signal line 126 to the partial area specify information arithmetic or change circuit 132, which receives the element X(i) of the vector X via the data path 127 so as to change the search range associated with the element X(i). The change operation is carried out according to the result of the comparison accomplished between the compare key value of X(i) received via the signal line 126 and the center value Y(j) of the search range, namely, if the compare key of X(i) is less than Y(j), the center element counter value j received via the data path 130 is employed as the new upper-limit value of the search range so as to change X(i), and then the change result is transmitted as the element Z(i) of the output vector Z via a data path 125 to the main storage 107. Furthermore, if the compare key value of X(i) is equal to or greater than Y(j), the center counter value j is adopted as the new lower-limit value of the search range so as to change X(i), and then the change result is transmitted as the element Z(i) of the output vector Z via a data path 125 to the main storage 107.

As described above, the gist of the present invention resides in the following operation. Namely, a compare key value indicating a search request and partial area specify information denoting a search range of each compare key are read in pair as a vector element so as to generate a read address of a vector element located at the center of the search range based on the positions of the upper and lower limits of the search range, and then a vector value of the center of the search range thus read out is compared with the value of the compare key representing the search request so as to change partial area specify information designating the search range. That is, there can be unnecessitated the updated processing conventionally carried out through a plurality of instructions on the vector including the compare key indicating the search request and the vectors of the upper-limit and lower-limit values of the search range.

When the value of the counter in the operand control circuit 106 exceeds the vector element count beforehand designated by a general purpose register, a terminate signal is sent via the signal line 120 to the instruction control circuit 104, which in turn terminates the transmission of a fetch request and a store request, thereby stopping the instruction execution. Thereafter, the next instruction is obtained from the main storage 107 and is set to the instruction word register 101 so as to continue the processing. Description has been given of the configuration and operations of a vector processor as an embodiment according to the present invention.

Figure 2:
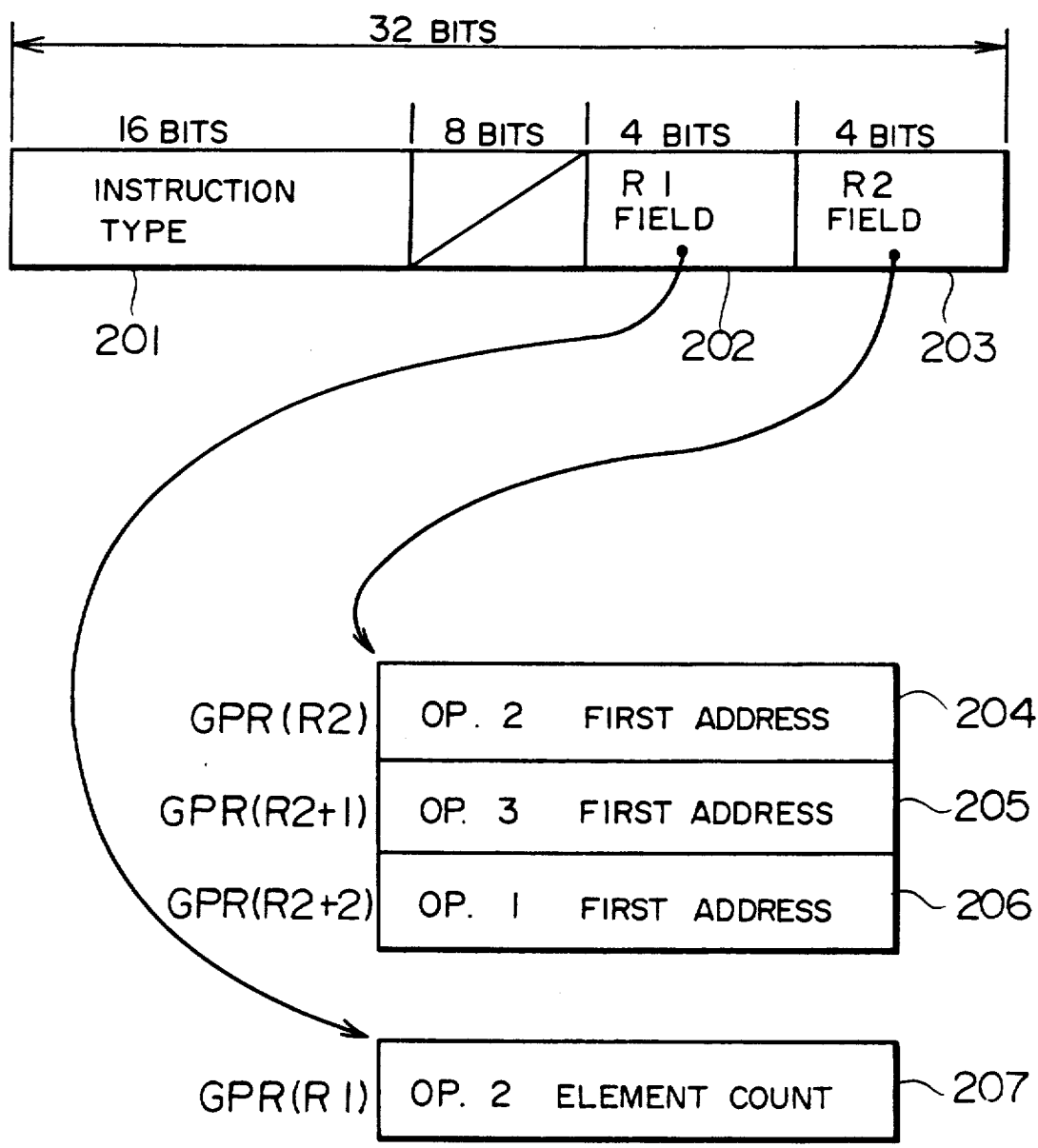
FIG. 2 is a diagram schematically illustrating an instruction format.

Prior to a description of detailed operations of the vector processor of FIG. 1, an instruction format of the vector instruction of this embodiment will be described with reference to FIG. 2. As shown in FIG. 2, the vector instruction includes a bit series comprising 32 bits of which 16 high-order bits 201 represent a kind of the vector instruction. An R1 field 202 denotes a 4-bit binary integer and specifies a general purpose register 207 having a number designated by an R1 field in a group of 16 GPR's 103 numbered as C0 to C15. Similarly, an R2 field is used to specify a general purpose register 204 and general purpose registers 205 and 206 subsequent thereto, each having the number equal to the value of the R2 field.

The GPRs 204 to 206 respectively denote the first addresses of the second operand (Op. 2), the third operand (Op. 3), and the first operand (Op. 1). The GPR 207 designates the number of elements of Op. 2. In the binary search operation, as shown in FIG. 8, the input vectors X and Y are processed as Op. 2 and Op. 3, respectively and the output vector Z is treated as Op. 1.

Figure 8:
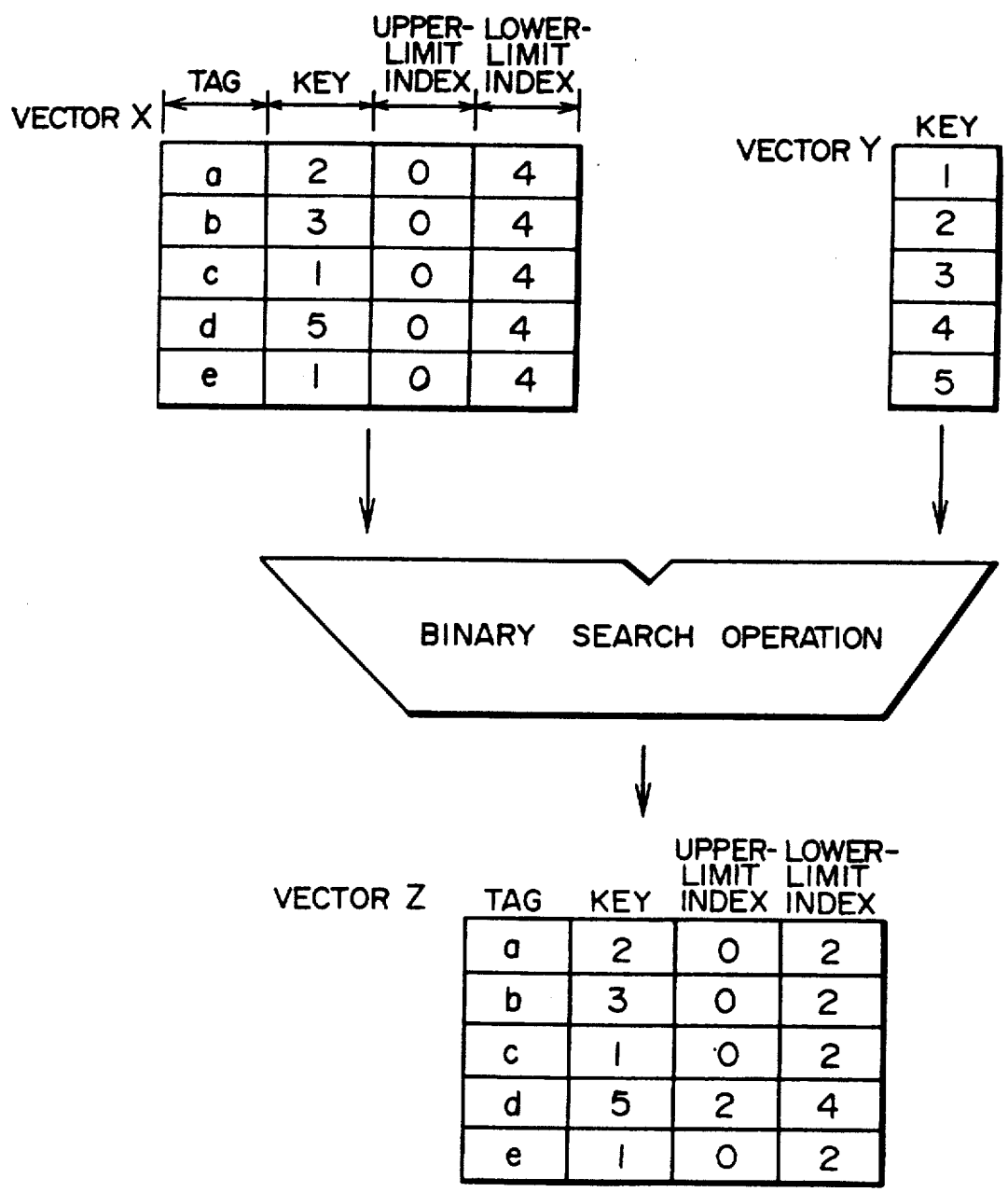
FIG. 8 is a schematic diagram showing a processing example of a binary search operation in the vector processor according to the present invention.
Figure 9:
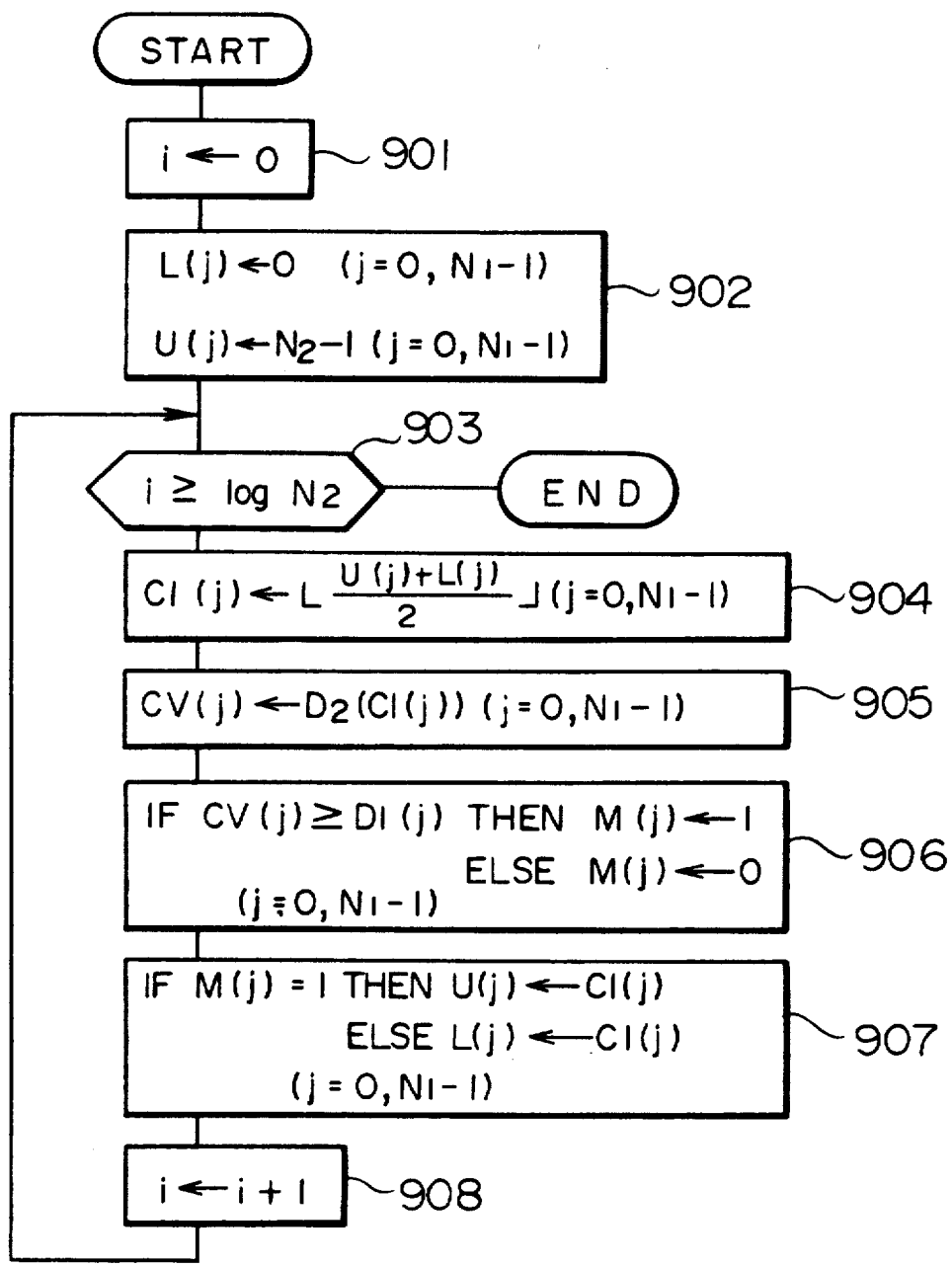
FIG. 9 is a flowchart of a vectorized binary search operation according to the prior art.

Consequently, in the example of FIG. 8, the first addresses of X, Y, and Z are set to the GPRs 204 to 206, respectively. In this example, since the number of elements of Op. 2 is five, 5 is set to the GPR 207, thereby attaining the result of FIG. 8. In the binary search operation, the length of the input vector Op. 3 as an object of the search is not directly related to the search operation and the number of elements of the output vector Op. 1 is equal to that of elements of the input vector Op. 2, a processing to effect an error check on the number of vector elements is not effected in this embodiment. In order to detect a condition to suppress an execution of an instruction when a value exceeding the length of the input vector Op. 3 with respect to the search range is supplied as the upper-limit value of the input vector Op. 2, it is only necessary to provide a general purpose register to which the number of elements of Op. 3 is set.

The instruction format has been described.

Figure 3:
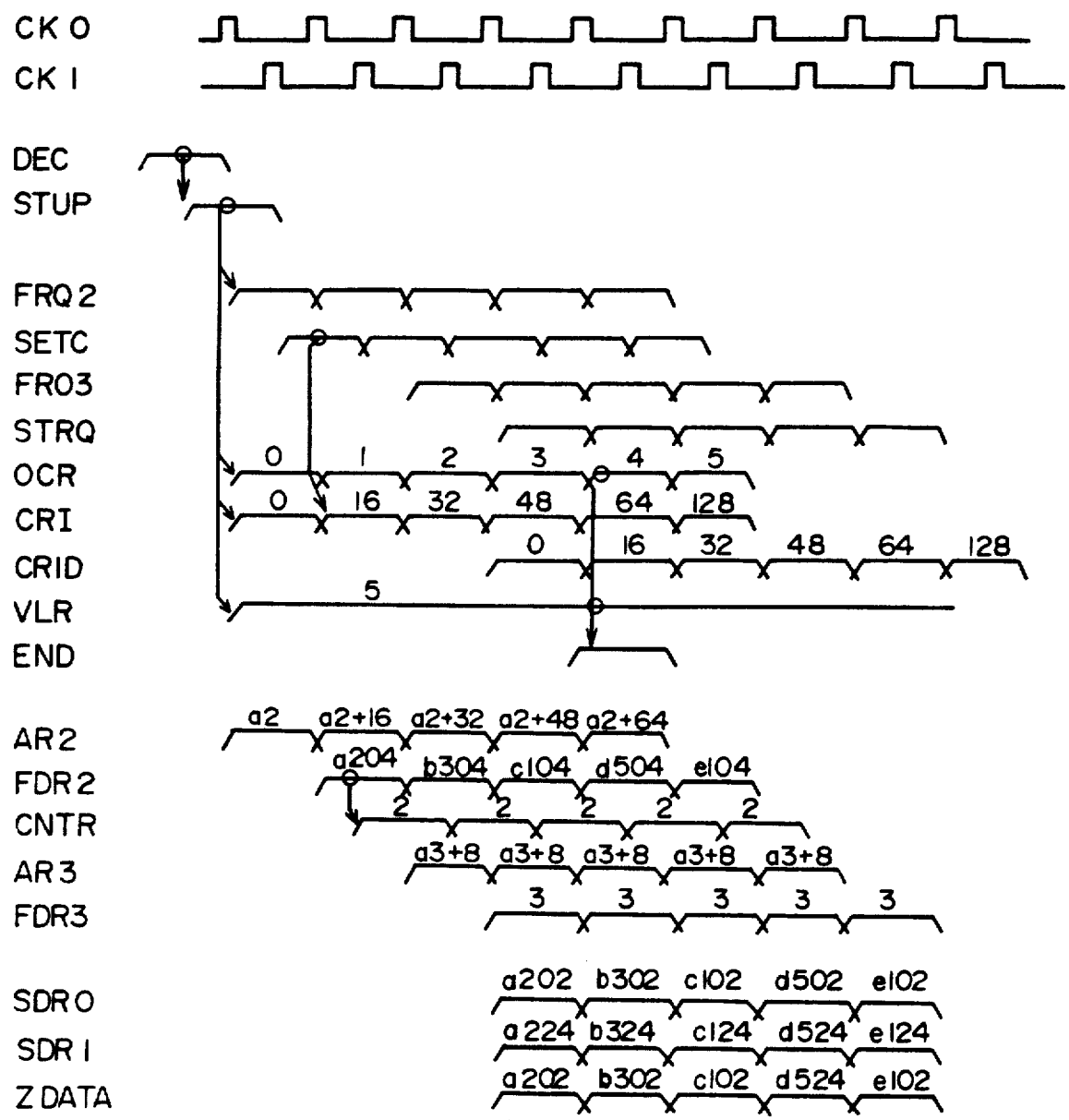
FIG. 3 is a timing chart associated with the operation of the vector processor.

Next, description will be given of detailed operations of the vector processor of FIG. 1 as an embodiment according to the present invention in which the processing data items X and Y of FIG. 8 stored according to the structure in the main storage 107 are processed in the binary search operation. Concretely, the operations will be described along the timing chart of FIG. 3 indicating the processing procedure with reference to the configurations (FIGS. 4 to 7) of the respective logic circuits associated with the operations. FIG. 3 is a timing chart of operations of the vector processor of FIG. 1, where Op. 2 and Op. 3 respectively stand for the vectors X and Y of FIG. 8. As shown in FIG. 3, in this vector processor, clock signals of two phases $CK_0$ and $CK_1$ are used for establishing synchronization.

When the vector instruction in the format of FIG. 2 loaded into the instruction register 101 is interpreted by the interpret circuit 102 and is found to be a binary search instruction, a decoder (DEC) signal 112 notifying the pertinent condition is generated in the instruction control circuit 104.

Figure 4:
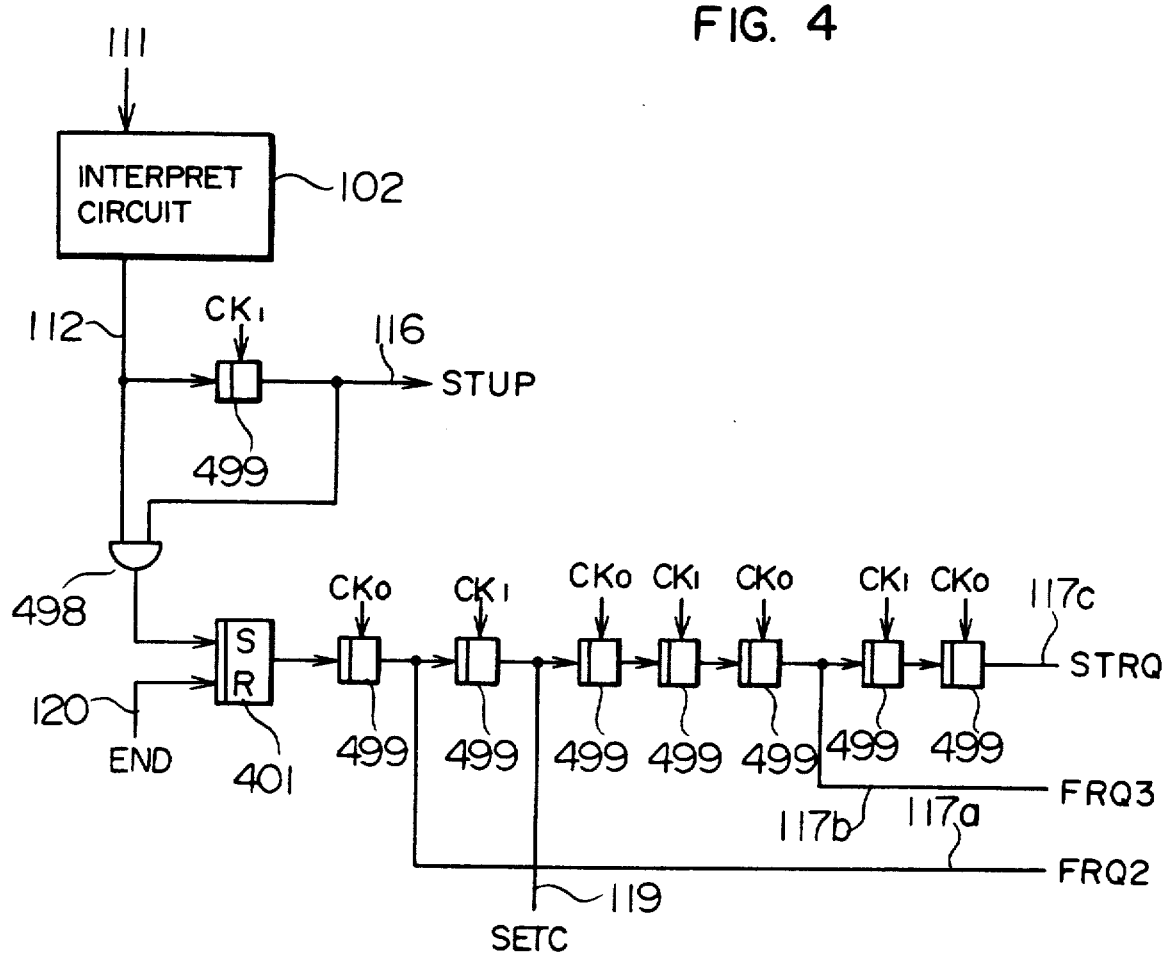
FIG. 4 is a configuration diagram showing the configuration of an instruction control circuit.

FIG. 4 shows the configuration of the instruction control circuit 104.

In response to the DEC signal 112, the instruction control circuit 104 generates a signal STUP 116 instructing the initialization of the respective circuits. In concurrence with the operation above, a hold-type flip-flop circuit 401 is set to indicate that control is passed to the processing of the binary search instruction. The operation timing is adjusted by means of a latch circuit 499 and an AND circuit 498.

The STUP signal 116 is sent to the address control circuit 105 and the operand control circuit 106 for the initialization.

Figure 5:
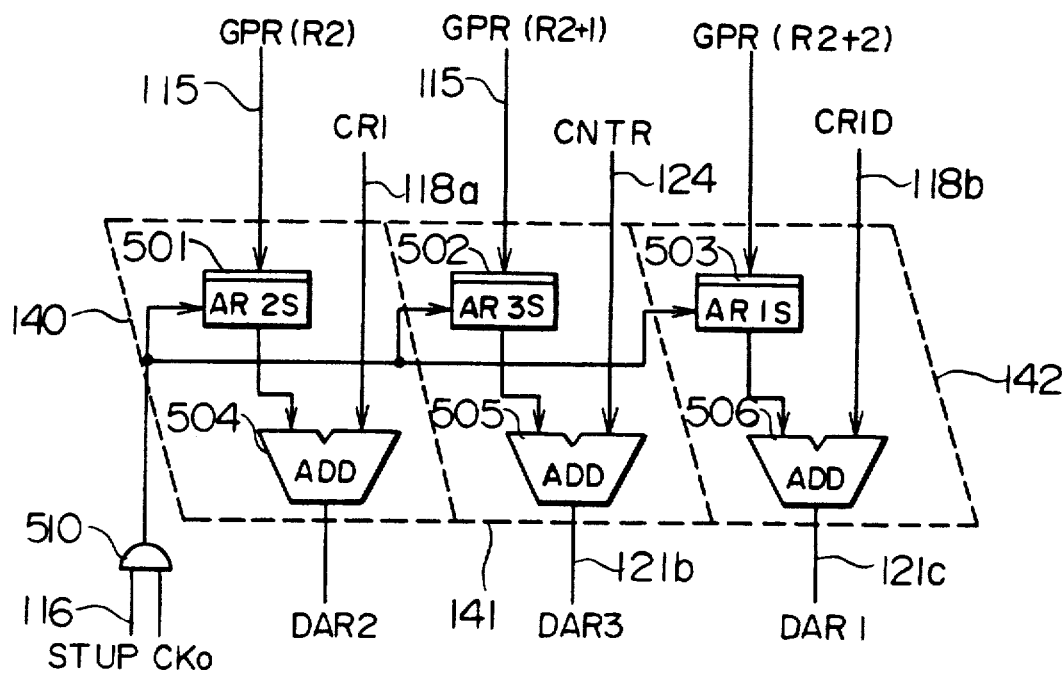
FIG. 5 is a schematic diagram showing the configuration of an address control circuit.

FIG. 5 shows the configuration of the address control circuit 105. In response to the initialize signal 116 transmitted from the instruction control circuit 105, the first addresses (a2, a3, and a1) respectively of the second, third, and first operands stored in the GPR's 204 to 206 specified by the instruction register 101 via the signal line 113 are set to the first address registers AR2S 501, AR3S 502, and AR1S 503, respectively, thereby completing the initialization of the address control circuit 105. An AND circuit 510 is provided to adjust the timing to set the AR2S 501, AR3S 502, and AR1S 503.

Figure 6:
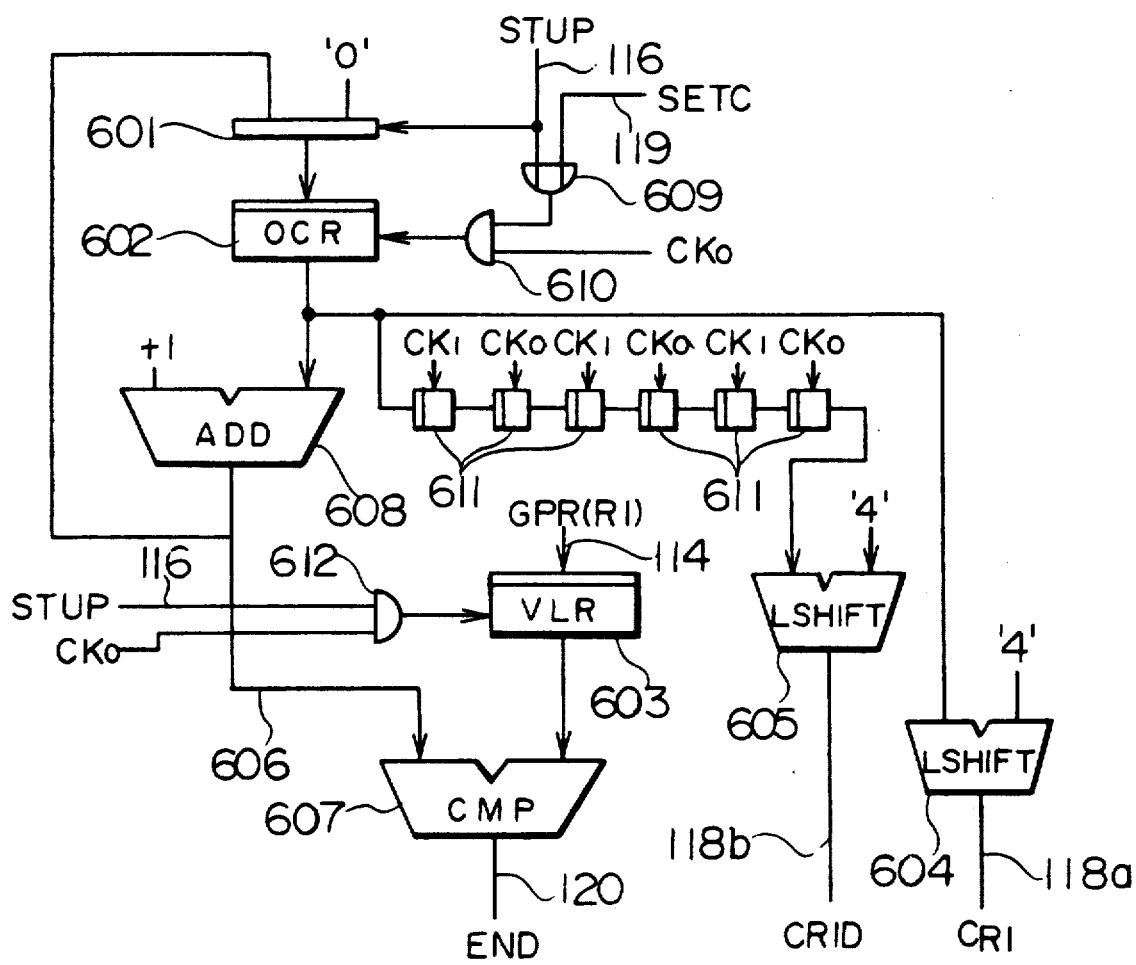
FIG. 6 is a diagram schematically showing the configuration of an operand control circuit.

FIG. 6 shows the configuration of the operand control circuit 106. In response to the initialize signal 116, an initial value '0' is set via a selector 601 to an operand counter OCR 602. Furthermore, the number of elements of Op. 2 stored in the GPR 207 is transmitted via the data path 114 to an element count register VLR 603 so as to be set thereto in response to the initialize signal STUP 116. An AND circuit 612 is provided to adjust the timing to set the element count register VLR 603. Through the operations above, the initialization of the operand control circuit 106 is completed.

At a timing delayed by one clock with respect to the DEC signal 112, a fetch request signal FRQ2 for the second operand Op. 2 is delivered from the instruction control circuit 104 via the data path 117a to the main storage 10.. Thereafter, the fetch request signal FRQ2 is issued each time a clock signal is received.

Although the binary search operation is accomplished for the respective vector elements of the Op. 2 subsequently fetched, description will be given of the operation herebelow centered on the first vector element of the input vector Op. 2 when data of FIG. 8 is supplied as an input.

First, the value of the operand counter OCR 602 is set to '0' in response to the STUP signal 116. The counter value is shifted to the left by the shifter 604 so as to be multiplied by the magnitude (16 bytes) of the vector elements of the operand vector Op. 2 and is then delivered via the data path CRI 118a to the address control circuit 105 as an offset value with respect to the vector first address of the vector element indicated by the counter OCR 602 in byte units. (In this case, the pertinent item is the first element of the vector, the value is kept to be '0'.) The offset value supplied to the address control circuit 105 is added by the adder 504 to the first address a2 of the input vector Op. 2 stored in the first address register AR2S 501 and the result of the addition is then transmitted via the data path DAR2 121a to the main storage 107 so as to be stored in the fetch address register AR2 of the main storage 107 as a fetch address associated with the vector element of the input vector Op. 2.

Figure 7:
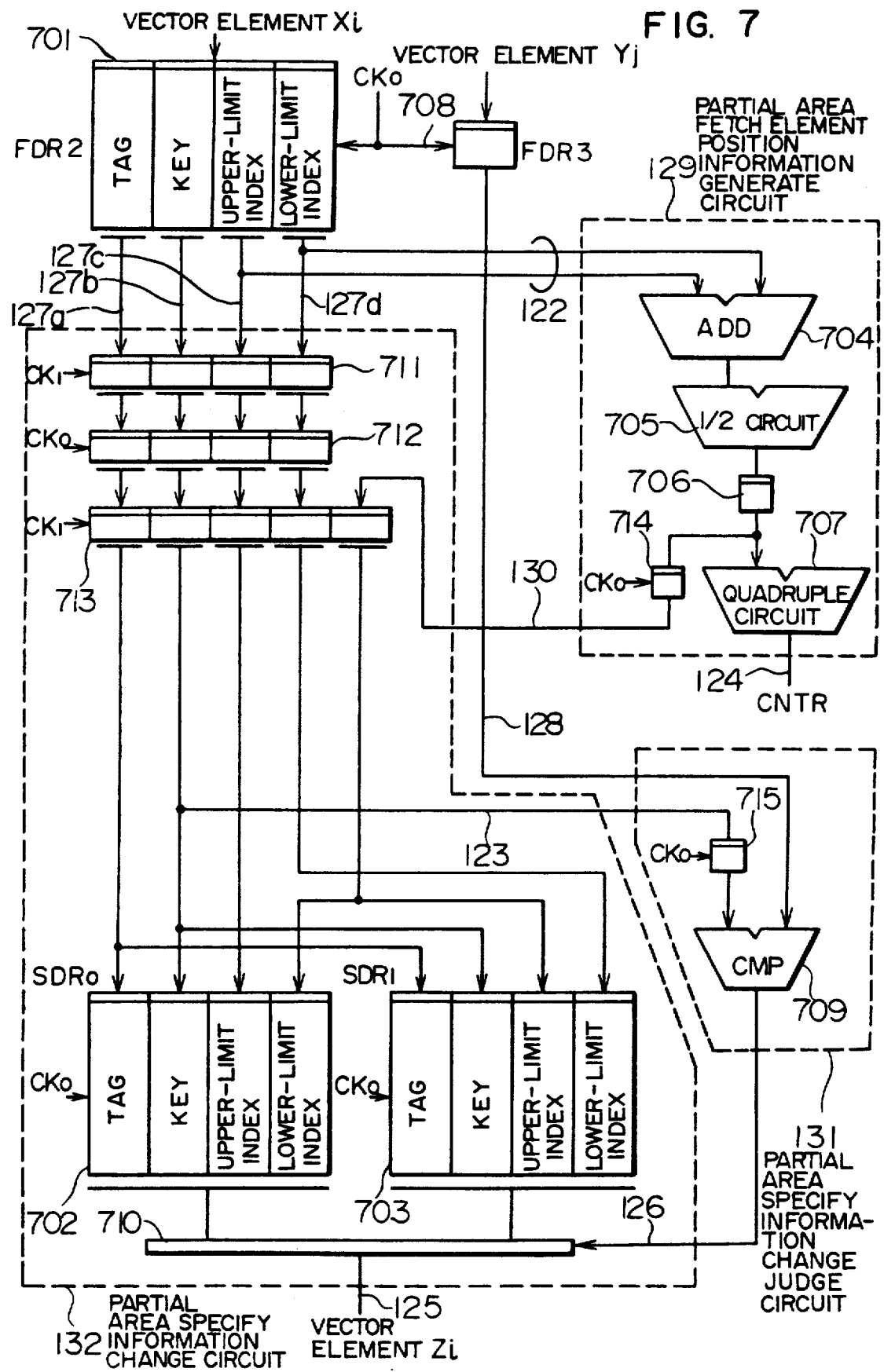
FIG. 7 is a schematic diagram showing configurations of a circuit for generating information about a fetch element position in a partial area, a circuit for judging a change in information specifying a partial area, and an arithmetic circuit for changing information specifying a partial area.

Upon receiving the fetch request signal FRQ2 117a, the main storage 107 reads a vector element of Op. 2 from the address indicated by the value stored in the fetch address register AR2 and then stores the attained vector element in the fetch data register FDR2 701 of the main storage 107 (FIG. 7).

Of the vector element of Op. 2 thus read out (in the example of FIG. 8, the first element 'a204' of the input vector X), partial area specify information designating the upper and lower limits of the search range (in this example, a pair '04' including a subscript '0' of the vector element located at the upper limit of the partial area of the vector Y and a subscript '4' of the vector element located at the lower limit) is transmitted via the data path 122 to the partial area fetch position information generate circuit 129.

FIG. 7 shows the configuration of the partial area fetch position information generate circuit 129. The subscript values of the upper and lower limits of the search range received via the data path 122 ('0' and '4' in this example) are added to each other in the adder 704 and the result of the addition is shifted by one bit to the right in the shifter 705. As a result, the subscript of the vector element located at the center of the search range is attained. (In this example, $(0+4) \div 2 = 2$ results and hence a vector element with a subscript of 2 is set as the vector element at the center of the search range.) The obtained subscript value is latched into the register 706. The value of the subscript assigned to the vector element at the center of the search range is sent via the data path 130 to the partial area specify information arithmetic or change circuit 132; furthermore, the value is multiplied by four in the quardruple circuit 707 and is then multiplied by the length (four bytes) of the element of Op. 3 (vector Y). The resultant value is sent via the data path 124 to the address control circuit 105 as an offset value ('8' in this case because $2 \times 4 = 8$) with respect to the first address of Op. 3 in byte units.

The address control circuit 105 adds by means of the adder 505 the first address of the input vector Op. 3 stored in the first address register AR3S 502 to the offset value in byte units received via the data path 124 so as to send the result of the addition via the data path DAR3 121$b$ to the main storage 107, which in turn loads the result i the fetch address register AR3 thereof ('a3+8' is assumed to be the fetch address in this case). The process above is accomplished in a period of a clock, namely, after the vector element of the vector Op. 2 is fetched into the fetch data register FDR2, the fetch address of the vector Op. 3 is determined with the subsequent clock $CK_0$.

At the same time, a fetch request signal FRQ3 for the vector Op. 3 delayed by two clocks with respect to the fetch request FRQ2 for the vector Op. 2 is transmitted from the instruction control circuit 104 via the data path 117$b$ to the main storage 107.

Upon receiving the fetch request FRQ3, the main storage 107 reads a vector element of Op. 3 according to the fetch address stored via the data path 121$b$ and then transfers the vector element to the fetch data register FDR3 708. (In this example, the third element relative to the first element of the vector Y, namely, $Y(2) = '3'$ is read into FDR3 708 as a value of the element at the center of the search range.)

During the execution of the fetch operation of the vector Op. 3, the partial area specify information arithmetic or change circuit 132 generates an update result of the search range based on the subscript ('2' in this example) of the element located at the center of the search range received via the data path 130. Namely, the store data registers SDR0 702 and SDR1 703 are loaded with data as follows. The range represented by the upper-limit index value Ui (the value of the subscript of the upper-limit element) and the lower-limit index value Li (the value of the subscript of the lower-limit element) in the fetch data register FDR2 is divided by two by the value of the subscript Mi of the element located at the center of the search range received via the data path 130 such that the new search range (represented with a pair of two subscripts Ui and Mi) having the smaller subscript values are stored in the upper-limit and lower-limit index values of $SDR_0$ 702, whereas the new search range (represented with a pair of two subscripts Mi and Li) having the greater subscript values are stored in $SDR_1$ 703. In addition, the tag and key values received from the fetch data registers FDR2 via the respective data paths 127$a$ and 127$b$ are set to $SDR_0$ 702 and $SDR_1$ 703. Registers 711 to 713 are provided to adjust the timing of the operation.

The update results of the search range generated in the two store registers of the partial area specify information arithmetic or change circuit 132 are processed as follows. Namely, depending on the compare result sent via the control line to the store data selector 710 indicating the result of the comparison between the value ('2' in this example) of the compare key designating the search request associated with the vector element Xi and the value ('3' in this example) of the vector element Yj, the value of data to be stored in the main storage 107 is determined. That is, the partial area specify information change judge circuit 131 compares by means of the comparator 709 the value of the compare key of the vector element Xi received via the data path 123 with the value of the vector element Yj received via the data path 128 so as to deliver the result of the comparison via the signal line 126 to the partial area specify information arithmetic or change circuit 132. If the value of the compare key of the vector element Xi is smaller than the value of the vector element Yj, the partial area specify information arithmetic or change circuit 132 selects the value of the store register $SDR_0$ 702 ('a202' in this example); otherwise, the value of the store register $SDR_1$ 703 ('a224' in this example) is selected. (Note that, the value of $SDR_0$ is selected in this case.)

As described above, when a period of two clocks is elapsed from when there is determined the fetch data of the fetch data register $FDR_2$ 701 including the value of the vector element Xi constituted with the compare key indicating the search request and a pair of values designating the search range, the value of the vector element Yj located at the center of the search range is loaded in the fetch data register $FDR_3$ 708, namely, the store data is determined and is transmitted via the data path 125 to the main storage 107. At the same time, a store request is sent via the signal line 117$c$ to the main storage 107. Since the counter of the vector Op. 1 (vector Z) as the store destination can be assumed to be identical to the input vector Op. 2 (vector X), the value attained by delaying the value ('0' in this example) of the operand counter OCR 602 by three clocks (the operation timing is adjusted by means of the register 611) is shifted by four bits to the left in the shifter 605 so as to be converted into an offset value (kept remained to be '0' in this example) with respect to the first address of the vector Op. 1 (vector Z) in byte units. The resultant value is sent via the data path CRID 118$b$ to the address control circuit 105. In the address control circuit 105, the value ('a1' in this example) of the first address register AR1S 503 holding the first address of the operand vector Op. 1 (vector Z) is added to the offset value ('0' in this example) in byte units sent via the data path CRID 118$b$ in the adder 506, and the result of the addition is then transmitted as a store address via the data path DAR1 121$c$ to the store address register of the main storage 107. Upon receiving the store request signal STRQ 117$c$, the main storage 107 stores the value ('a202' in this example) received via the data path 125 in a location indicated by the store address register.

On the other hand, in response to the counter set signal 119 transmitted from the instruction control circuit 104, the value of the operand counter OCR 602 is incremented by one and becomes to be '1'. Consequently, the address registers associated with Op. 2 and Op. 1 are respectively updated to indicate the next processing elements of the vectors X and Z, respectively. Thereafter, each time the fetch request FRQ2 117$a$ is transmitted, the binary search processing is similarly accomplished on the second and subsequent vecto elements of the input vector Op. 2.

When the operand counter OCR 602 indicates the last element (the OCR content is '4' in this example) of the input vector Op. 2 (vector X) as a result of the processing thus achieved, a value attained by adding one to the content of the OCR 602 is transmitted via the data path 606. The value here matches with the value held in the vector count register VLR 607 in the operand control circuit 106. The matching condition is detected by the comparator CMP 607 and then the instruction processing end signal END is sent via the signal line 120 to the instruction control circuit 104, which in turn resets the flip-flop circuit 401 indicating that the binary search operation is being processed. As a result, the fetch requests FRQ2 117a and FRQ3 117b and the store request STRQ 117c are terminated, thereby ending the processing of the binary search operation.

After the processing of the binary search instruction is completed, the vector Z is attained as the first operand vector of the instruction in the main storage 107. The vector Z includes elements each comprising a tag, a key, and values of subscripts of elements respectively located at the upper and lower limits of a partial area of the vector Y where a vector element having a value equal to the value of the key is considered to exist. Assuming that the vector Y includes N elements, if this instruction is repeatedly executed $\log_2 N$ times, the search range converges to a single vector element.

According to the present invention, in the case where a vector operation is to be executed in a vector processor having two read means on three input vectors including a first vector comprising first values each indicating an object of the operation, a second vector including address values for second values to be used as objects of the operation, and a third vector including said second values wherein the vector operation is achieved for the respective corresponding vector elements of the first and second vectors; elements of the first and second vectors are read by first read means for the corresponding elements thereof, second read means is initiated depending on the value of the element of the second vector so as to read an element of the third vector, thereby executing an operation with the element of the first vector beforehand read out. In the conventional vector processor having two read means, the overall processing is subdivided into two processing parts including a processing in which an element of the third vector is referenced and moved according to an address value of the second vector so as to temporarily generate a vector in a work area and a processing in which an operation is achieved between the vector thus temporarily generated in the work area and the first vector. Furthermore, since the number of read means is limited to two, the two processing procedures above cannot be carried out in an overlapped fashion.

According to the present invention, the two processing procedures are combined into a processing; moreover, the processing is achieved in an overlapped fashion, which enables the processing speed to be increased.

Incidentally, although the description has been given of circuits executing vector instructions associated with a binary search processing, the present invention is not restricted by those circuits, namely, various variations thereof can be included in the present invention without departing from the scope and spirit of the present invention.

We claim:

1. A vector processing apparatus comprising:
   means for holding a plurality of vectors each including a plurality of sequential elements;
   first read means connected to said holding means for sequentially reading from said holding means a group of elements of a first vector in an order of the elements, each element of the first vector including first and second portions, the first portion having data to receive an arithmetic or logic operation, the second portion having an index related to a corresponding element of the second vector which should receive the arithmetic or logic operation together with the element of the first vector;
   second read means connected to said holding means for sequentially reading from said holding means a group of elements of the second vector in parallel to reading of the group of elements of the first vector;
   operation means connected to said first and second read means for effecting in a pipeline manner the arithmetic or logic operation on pairs of operands, one operand of each pair including a first portion of an element of the first vector, read out by said first read means and another operand of the pair including a corresponding element of the second vector, read out by said second read means;
   said second read means including indirect read means for effecting a predetermined operation on respective second portions of respective elements of the first vector read out by said first read means, to generate addresses of corresponding elements of the second vector which are to be subjected to the arithmetic or logic operation together with the first portions of the respective elements of the first vector, and for sequentially reading from said holding means the corresponding elements of the second vector based on the generated addresses.

2. A vector processing apparatus according to claim 1 wherein:
   an index included in the second portion of each element of the first vector specifies a string of elements of the second vector including successive elements selected from elements of the second vector; and
   wherein said indirect read means includes
   address generate means for effecting an operation on the index included in each element of the first vector to generate an address signal for an element selected to be used as a corresponding element of the second vector to the element of the first vector, from successive elements in an element string of the second vector specified by the index, and
   means for reading the selected element in response to the address signal.

3. A vector processing apparatus according to claim 2, wherein said index includes a lower-limit index and an upper-limit index respectively specifying a starting element and a last element of an element string within the second vector.

4. A vector processing apparatus according to claim 3, wherein said selected element is an element located at a center of the element string.

5. A vector processing apparatus according to claim 2, wherein said operation means comprises:
   means for comparing a first portion of each element of the first vector with an element of the second vector corresponding thereto; and
   means operative in response to an output from said comparing means for generating a new index which specifies starting and last elements of a selected one of a front-half element string and a rear-half element string attained by subdividing an element string specified by the index included in the second portion of the element.

6. A vector processing apparatus according to claim 5, wherein
   said index included in the second portion of each element of said first vector includes a lower-limit index and an upper-limit index respectively specifying a starting element and a last element of an element string of the second vector;
wherein the selected element for which the address signal is generated by said signal generate means is an element of the second vector, located at a center of an element string specified by the index included in the second portion of the element of the first vector; and
wherein the selected one string for which the new index is generated by said index generating means is the rear-half element or the front-half element string, depending on whether the first portion of each element of the first vector is greater than a corresponding element of the second vector.

7. A vector processing apparatus according to claim 1, wherein said operation means comprising:
first operation means for effecting an operation on the first portion of each element of the first vector and an element of the second vector corresponding to the element; and
second operation means responsive to an output from said first operation means for effecting a processing on the element of the first vector, the processing being determined depending on the output.

8. A vector processing apparatus according to claim 7 wherein
said first operation means is a comparator; and
said second operation means includes means for changing the second portion of the element of the first vector to first and second values respectively in response to a first output from said comparator and a second output from said comparator.

9. A vector accessing circuit comprising:
means for holding a plurality of vectors each including a plurality of sequential elements;
first read means connected to said holding means for sequentially reading a group of elements of a fist vector from said holding means; and
second read means connected to said holding means and said first read means for sequentially reading, from said holding means selected elements of a group of elements of a second vector each specified by one element of the first vector read out by said first read means;
wherein said each element of the first vector including an index specifying an element string including consecutive elements selected from the elements of the second vector; and
wherein said second read means includes means for effecting an operation on the index included in each element of the first vector, to generate, as a result of the operation, an address of a selected element in the element string specified by said index, and for reading said selected element based on said address.

10. A vector accessing circuit according to claim 9 wherein said index includes a lower-limit index and an upper-limit index respectively specifying a first element and a last element string to be specified.

11. A vector processor comprising:
means for holding a first vector and a second vector, each including a plurality of sequential elements;
first and second read means connected to said holding means for sequentially reading elements of the first and second vectors, respectively from said holding means;
operation means connected to said first and second read means for effecting an arithmetic or logic operation on the elements of the first and second vectors thus read out;
write means for storing a result of the arithmetic or logic operation by said operation means in said holding means;
wherein each element of the first vector includes a pair of a first part and a second part;
position information generate means connected to said first and second read means for generating, from the second part of each element of the first vector thus read out by said first read means, a position information to reference a particular element of the second vector to be read by said second means; and
said operation means including means for effecting the arithmetic or logic operation on an element of the second vector thus read out for each element of the first vector and the first part of the element of the first vector, thereby transmitting a result of the arithmetic or logic operation to said write means.

12. A vector processor according to claim 11, wherein the second part of an element of the first vector is information specifying a partial area of the second vector including a vector element or a plurality of mutually adjacent vector elements of the second vector.

13. A vector processing according to claim 11, wherein said information specifying said partial area includes a reference position of a vector element existing at an upper limit of said area and a reference position of a vector element existing at a lower limit of said area.

14. A vector processing apparatus according to claim 1, wherein said first and second read means and said operation means are activated in response to a vector instruction among vector instructions executed by the vector processor.

15. A vector processing apparatus according to claim 1, further including means connected to said first read means for delaying first portions of the elements of the first vector, so that each element of the first vector and a corresponding element of the second vector are simultaneously supplied to said operation means.

16. A vector processing apparatus according to claim 6, further comprising
write means connected to said operation means and said holding means for sequentially writing new elements into said holding means each including a combination of the first portion of an element of the first vector and a new index generated by said index generating means as a result of an operation on the element of the first vector and a corresponding element of the second vector.

17. A vector processing apparatus, comprising:
means for holding a plurality of vectors each comprised of sequenced elements;
vector read means connected to said holding means for reading first to third vectors, including first and second read means, the first read means sequentially reading from said holding means reading a group of elements of the first vector and a group of elements of the second vector, each corresponding to one element of the first vector and including an index specifying a selected element string within the third vector, comprised of the second read means sequentially reading selected elements of a second vector, said second read means including indirect read means for effecting a predetermined operation on each element of the second vector read out by said first read means, for generating an address of a selected element of the third vector within an element string within the third vector, specified by the element of the second vector, and for reading the selected element based on the generated address from said holding means;

means connected to said vector read means for comparing each element of the first vector read out by said vector read means with an selected element of the second vector read out thereby from an element string within the third vector specified by an element of the second vector corresponding to the element of the first vector; and means operative in response to an output from said comparing means for generating a new index which specifies index of a selected a front-half element string and a rear-half element string attained by subdividing the element string specified by the index included in the corresponding element of the second vector.

18. A vector processing apparatus according to claim 17, wherein said index included in each element of said second vector includes a lower-limit index and an upper-limit index respectively specifying a starting element and a last element of an element string of the third vector;

wherein the selected element read out by said indirect read means is an element of the third vector, located at a center of the element string specified by the index included in the element of the second vector; and wherein the selected one string for which the new index is generated by said index generating means is the rear-half element string or the front-half element string, depending on whether or not the portion of the element of the first vector compared by said comparing means is greater than the selected element of the third vector compared by said comparing means 19. A vector processing apparatus according to claim 17, wherein said first read means comprises means for sequentially reading pairs of elements, from said holding means, one element of each pair comprising one element of the first vector, another element of the pair comprising an element of the second vector.

20. A vector processing apparatus according to claim 19, wherein said vector read means further includes means for delaying supply of each element of the first vector read out thereby, to said operation means until a corresponding element of the second vector is supplied to said operation means by said read means.

21. A vector processing method to be performed by a vector processor, comprising the steps of:

(a) sequentially reading, from vector a holding device, elements of a first vector (b) sequentially reading from said vector holding device, elements of a second vector in parallel to reading of the elements of the first vector, each element of the second vector corresponding to one of the elements of the first vector and specifying an element string within a third vector held by said vector holding device;

(c) responsive to the read elements of the second vector, sequentially reading, from said vector holding device, selected elements of the third vector each located at a center of an element string specified by one of the element of the second vector;

(d) delaying each element of the first vector until a corresponding element of the third vector is read from said vector holding device, the corresponding element being an element read out in response to an element of the second vector which corresponds to the element of the first vector;

(e) comparing each of delayed elements of the first vector with the read out corresponding element of the first vector; and (f) determining new indexes each for one element of the first vector, depending upon a result of the comparison by the step (e), the new index indicating either a front-half element string or a rear-half element string of an element string specified by an element of the second vector, corresponding to the element of the first vector.

22. A vector processing method according to claim 21, further comprising the steps of:

(g) storing into the vector holding device, the new indexes as elements of a new vector;

(h) repeating the steps (a) to (f) using the new vector, instead of the second vector; and (i) repeating the steps (g) and (h) until each of the new indexes generated at execution of the step (g) indicated an element string comprised of a single element of the third vector.

* * * * *